US008513571B2

(12) United States Patent
Gonzalez

(10) Patent No.: US 8,513,571 B2
(45) Date of Patent: Aug. 20, 2013

(54) TORTILLA CONVEYING SYSTEM FOR SEQUENTIALLY CONVEYING A PLURALITY OF TORTILLAS TO BE WARMED

(76) Inventor: Ricardo Gonzalez, Citrus Heights, CA (US)

( * ) Notice: Subject to any disclaimer, the term of this patent is extended or adjusted under 35 U.S.C. 154(b) by 201 days.

(21) Appl. No.: 13/019,780

(22) Filed: Feb. 2, 2011

(65) Prior Publication Data

US 2012/0193345 A1 Aug. 2, 2012

(51) Int. Cl.
*A21B 1/00* (2006.01)
*A21C 9/08* (2006.01)

(52) U.S. Cl.
USPC .............. 219/388; 99/352; 99/373; 99/393

(58) Field of Classification Search
USPC .............. 99/395–398, 422–424, 355, 352, 99/373, 377, 393, 407; 219/388
See application file for complete search history.

(56) References Cited

U.S. PATENT DOCUMENTS

| 2,182,682 | A |   | 12/1939 | Shroyer |        |
|-----------|---|---|---------|---------|--------|
| 2,864,932 | A |   | 12/1958 | Forrer  |        |
| 3,740,513 | A |   | 6/1973  | Peters, Jr. et al. | |
| 4,013,869 | A |   | 3/1977  | Orts    |        |
| 4,147,924 | A |   | 4/1979  | DeWitt, Jr. |    |
| 4,170,933 | A | * | 10/1979 | Meamber | 99/349 |
| 4,724,755 | A | * | 2/1988  | Escamilla | 99/349 |
| 4,769,252 | A |   | 9/1988  | Escamilla |      |
| 4,782,745 | A |   | 11/1988 | George, Jr. |    |
| 4,987,827 | A |   | 1/1991  | Marquez |        |
| 5,036,179 | A |   | 7/1991  | Westerberg et al. | |
| 5,123,178 | A |   | 6/1992  | Stein   |        |
| 5,531,156 | A | * | 7/1996  | Brummett | 99/450.1 |
| 5,535,664 | A |   | 7/1996  | Rokowski |      |
| 5,584,231 | A |   | 12/1996 | DeLeon  |        |

(Continued)

FOREIGN PATENT DOCUMENTS

DE 202004001460 U1 5/2004
EP 1252848 A3 1/2004

(Continued)

OTHER PUBLICATIONS

Google Search #1 downloaded on Jul. 16, 2009 http://www.zesco.com/products.cfm?subCatID=2519&PGroupID=040708AZ01.

(Continued)

*Primary Examiner* — Quang Van
*Assistant Examiner* — Michael LaFlame, Jr.
(74) *Attorney, Agent, or Firm* — Russ Weinzimmer & Associates P.C.

(57) ABSTRACT

An improved tortilla conveying system, for sequentially conveying a plurality of tortillas to be warmed, is disclosed. The conveying system provides a stack of tortillas and automatically conveys tortillas sequentially through a tortilla warmer. The tortillas are stored in a container. A dragger at least frictionally engages the top side of the top tortilla, dragging the tortilla off of the top of the container for subsequent heating by a heating element of the tortilla warmer. In some embodiments, the tortilla container can automatically elevate the stack of tortillas, so a top tortilla always remains exposed at the top of the container. In other embodiments, an extractor delivers the tortilla outside of the heating system once the tortilla is sufficiently warmed. The tortillas are warmed in sequence by a heating element, via conduction, convection, and/or radiation. In some embodiments, various components of the conveyer are synchronized, via a gearbox for example.

22 Claims, 15 Drawing Sheets

(56) References Cited

U.S. PATENT DOCUMENTS

| | | | |
|---|---|---|---|
| 5,676,051 A | 10/1997 | Sinemus | |
| 5,765,471 A | 6/1998 | Monard | |
| 5,918,533 A * | 7/1999 | Lawrence et al. | 99/339 |
| 5,948,301 A | 9/1999 | Liebermann | |
| D436,797 S | 1/2001 | Huang et al. | |
| D442,423 S | 5/2001 | Monard | |
| 6,268,592 B1 | 7/2001 | Hu et al. | |
| 6,318,225 B1 * | 11/2001 | Longoria | 83/454 |
| 6,373,030 B1 | 4/2002 | Waldrep | |
| 6,838,644 B1 | 1/2005 | Chung-Ting | |
| 7,012,218 B2 | 3/2006 | Flinn | |
| 7,094,991 B2 | 8/2006 | Naranjo et al. | |
| 7,235,762 B2 | 6/2007 | Gagas et al. | |
| 7,495,196 B2 | 2/2009 | Groll | |
| 2002/0152898 A1 | 10/2002 | DuBois et al. | |
| 2003/0052117 A1 | 3/2003 | Iniestra Hernandez | |
| 2005/0006375 A1 | 1/2005 | Naranjo et al. | |
| 2005/0092581 A1 * | 5/2005 | Walker | 198/433 |
| 2006/0185527 A1 | 8/2006 | Shei | |
| 2006/0289426 A1 | 12/2006 | Naranjo et al. | |
| 2007/0034096 A1 | 2/2007 | Axinte et al. | |
| 2007/0272676 A1 | 11/2007 | Zougou et al. | |
| 2008/0138480 A1 * | 6/2008 | Bows et al. | 426/465 |
| 2008/0282903 A1 | 11/2008 | Gonzalez | |

FOREIGN PATENT DOCUMENTS

| | | |
|---|---|---|
| EP | 1739358 A1 | 1/2007 |
| WO | 0065970 | 11/2000 |
| WO | 2005034697 A1 | 4/2005 |
| WO | 2006040540 A1 | 4/2006 |

OTHER PUBLICATIONS

Google Search #2 downloaded on Jul. 16, 2009 http://www.zesco.com/products.cfm?subCatID=2519&PGroupID=ZP99092003.

Google Search #3 downloaded on Jul. 16, 2009 http://www.zesco.com/products.cfm?subCatID=1818&PGroupID=050831SS03.

Google Search #4 downloaded on Jul. 16, 2009 http://www.bigtray.com/vollrath-heat-n-serve-food-warmer-72050-sku-vol72050-c-13130.html.

Google Search #5 downloaded on Jul. 16, 2009 http://www.restaurantequipment.com/STAR1HOTDOG.htm.

Google Search #6 downloaded on Jul. 16, 2009 http://cgi.ebay.com.my/Elite-Cuisine-Pizzelle-Maker-Flatbread-Tortilla-Warmer__W0QQcmdZViewItemQQitemZ120388470195.

Google Search #7 downloaded on Jul. 16, 2009 http://www.cooking.com/products/shprodde.asp?SKU=193716.

Google Search #8 downloaded on Jul. 16, 2009 http://www.cooking.com/products/shprodde.asp?SKU=392776.

Google Search #9 downloaded on Jul. 16, 2009 http://www.kitchengadgetry.com/kitchen/gadgets/star-tortilla-grill-tg1-p-6664.html.

* cited by examiner

US 8,513,571 B2

TORTILLA CONVEYING SYSTEM FOR SEQUENTIALLY CONVEYING A PLURALITY OF TORTILLAS TO BE WARMED

FIELD

The invention relates generally to food preparation devices, and more specifically to tortilla warmers.

BACKGROUND

Tortillas are a popular food item, usually enjoyed best when they have just been cooked. Uncooked tortillas typically do not provide the same taste appeal as warmed tortillas. Often, tortillas are eaten in combination with other hand-held food. Preparing such meals would require an added step beforehand, in order to warm the tortilla so as to optimize the tortilla's flavor and texture.

Heating devices, including devices designed specifically for heating tortillas, are known in the art. Tortilla warmers are popular for their ability to warm tortillas to an appropriate temperature so as to be properly enjoyed with a meal. However, current tortilla warmer equipment has significant drawbacks.

Many tortilla warmers attempt to warm multiple tortillas as a batch, rather than one at a time in series. This does not ensure that all tortillas will be heated to the same degree, and can cause sticking among tortillas. Other warmers that allow for heating of multiple tortillas require input of each tortilla into a separate compartment, which takes away from the convenience of a tortilla warmer.

Still other warmers that do warm tortillas in series nonetheless require insertion of one tortilla at a time, also detracting from the convenience to the user.

SUMMARY

An improved tortilla conveying system, for sequentially conveying a plurality of tortillas to be warmed, is disclosed and claimed. The conveying system provides a stack of tortillas and automatically conveys tortillas sequentially through a tortilla warmer. The tortillas are stored in a container. A dragger at least frictionally engages the top side of the top tortilla, dragging the tortilla off of the top of the container for subsequent heating by a heating element of the tortilla warmer.

The tortilla container can automatically elevate the stack of tortillas, so a top tortilla always remains exposed at the top of the container. An extractor delivers the tortilla outside of the heating system once the tortilla is sufficiently warmed. The tortillas are warmed in sequence by a heating element, via conduction, convection, and/or radiation. In some embodiments, various components of the conveyer are synchronized, via a gearbox for example.

A general aspect of the invention is a tortilla conveying system of a tortilla warmer, for sequentially conveying a plurality of tortillas to be warmed. The tortilla conveying system includes: a container capable of holding a plurality of tortillas in a stacked configuration, with a top side of a top tortilla being exposed at a top of the container; and a dragger capable of at least frictionally engaging the top side of the top tortilla, and then dragging the top tortilla off of the top of the container for subsequent heating by a heating element of the tortilla warmer.

In some embodiments of the tortilla conveying system, the dragger includes a dragger head which makes direct contact with the top side of the top tortilla, so as to facilitate the at least frictional engagement with the top side of the top tortilla. In some of these embodiments, the dragger head is constrained to move horizontally within a track.

In some other embodiments including a dragger head, the dragger head includes a set of nails located on an underside of the dragger head. In some of these embodiments, the set of nails are arranged along a set of lines passing through a center of the underside of the dragger head. In some of these embodiments, the set of nails engage the top side of the top tortilla so as to create static friction between the set of nails and the top side of the top tortilla, depress the top side of the top tortilla, and/or pierce the top side of the top tortilla. In other embodiments including a set of nails, the set of nails are configured to create perforations in each tortilla, when it is the top tortilla.

In some embodiments, the dragger includes a dragger head mover, the dragger head mover moving the dragger head substantially laterally, so as to facilitate the dragging of the top tortilla.

In some embodiments, the dragger is driven by a rotating element that is pivotably connected to the dragger. In some of these embodiments, the rotating element is directly driven by a motor.

In some embodiments, the container includes an elevator assembly for ensuring a top side of a top tortilla is constantly exposed at a top opening of the container. In some embodiments, the tortilla conveying system further includes a synchronizing control system for synchronizing movement of the elevator assembly and the dragger.

In some embodiments, the tortilla conveying system further includes at least one heating element. In some of these embodiments, the heating element is a conductive heating platform. In some embodiments, the tortilla warmer includes an extractor capable of delivering the top tortilla outside of the heating sub-system. In some embodiments, the tortilla conveying system further includes a lid for covering the top of the container when the at least one tortilla is not being warmed.

In some embodiments, heating of the top tortilla is performed by conduction, convection, and/or radiation. In some of these embodiments, conduction is produced by at least one heated roller. In some embodiments, radiation is produced by a resistive heating element, a microwave magnetron, or a carbon infrared emitter.

In some embodiments, the tortilla conveying system further comprises a housing to house the container and the dragger. In some of these embodiments, the housing further comprises a door which provides access to the container.

In another general aspect of the invention, a tortilla conveying system includes: a container capable of holding a plurality of tortillas in a stacked configuration, with a top side of a top tortilla being exposed at a top of the container; a dragger capable of at least frictionally engaging the top side of the top tortilla, and then dragging the top tortilla off of the top of the container for subsequent heating by a heating element of the tortilla warmer; a top heating platform, the top heating platform being capable of receiving the tortilla for heating by a heating element and rotating vertically so as to cause the top tortilla to slide off of the top heating platform; a slider adapted to guide the top tortilla sliding off of the top heating platform and to cause the top tortilla to land upside down onto a bottom heating platform; and a bottom heating platform, the bottom heating platform being capable of receiving the top tortilla in an upside-down configuration for further heating by a heating element, and delivering the top tortilla outside of the tortilla warmer.

In some embodiments, at the top heating platform and/or the bottom heating platform is a conductive heating element.

In some embodiments, the conveying system further includes a synchronizing control system for synchronizing movement of at least two of the following: the elevator assembly; the dragger; the top heating platform; and the bottom heating platform.

BRIEF DESCRIPTION OF THE DRAWINGS

The invention will be more fully understood by reference to the detailed description, in conjunction with the following figures, wherein.

DETAILED DESCRIPTION

Figure 1:
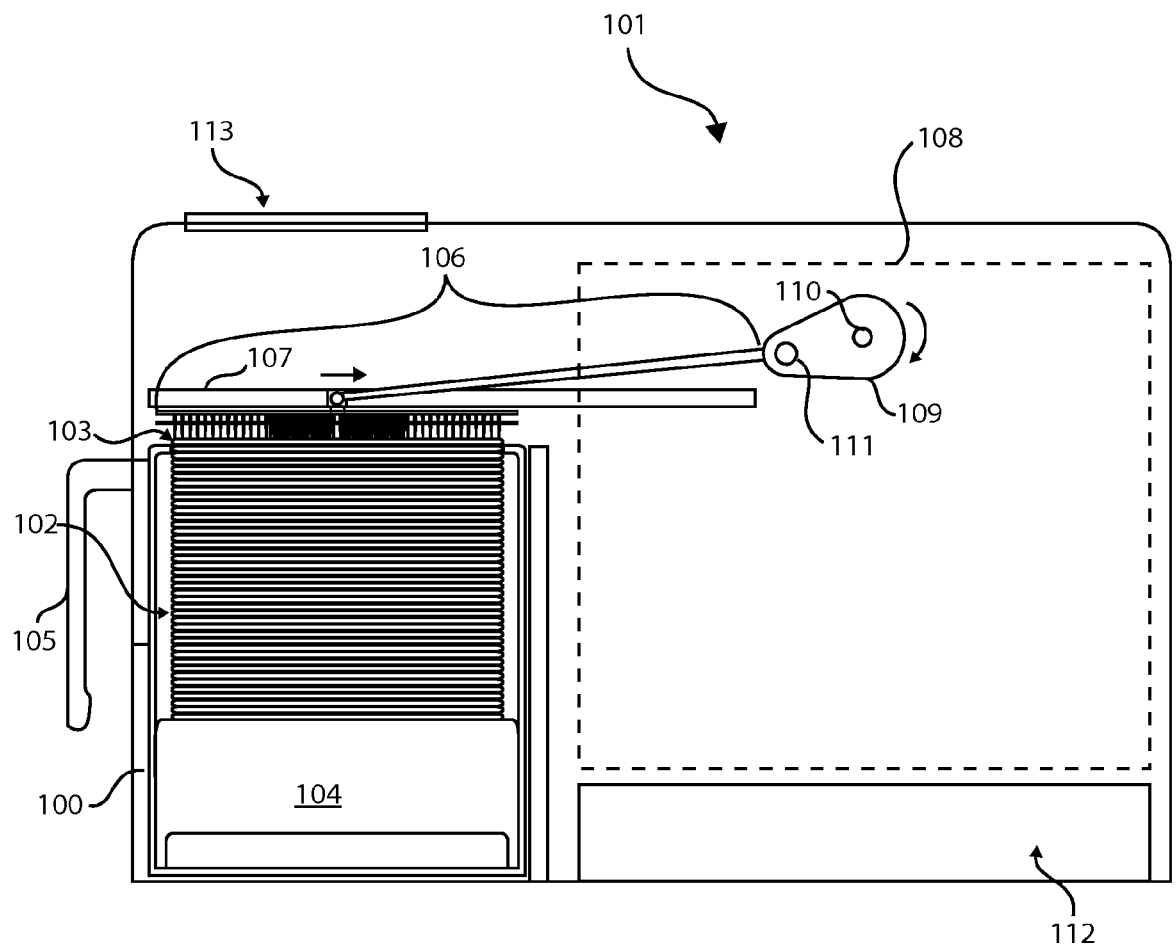
FIG. 1 is a profile view of the main elements of an embodiment of the tortilla warmer conveying system, with a dragger in a position to drag a top tortilla from a cartridge.

FIG. 1 is a profile view of the main elements of an embodiment of the tortilla warmer conveying system, with a dragger in a position to drag a top tortilla from a cartridge. A container 100 is shown holding multiple tortillas 102 in a vertically stacked configuration. The container 100 of the embodiment shown is a tortilla cartridge which can be inserted into the tortilla warmer 101 via a handle 105. A top tortilla 103 is exposed at its top surface. In some embodiments, the container 100 can include an elevator platform 104 for ensuring a top side of the top-most tortilla is always exposed at the top of the container, so as to be capable of being taken from the container 100. The elevator platform 104 can be driven by a motor-driven elevator for example, such as an assembly including a motor-driven gear.

Also shown is a dragger 106 capable of at least frictionally engaging the top side of the top tortilla 103, such as maintaining contact with the top tortilla 103 via static friction, and dragging the top tortilla 103 off the stack of tortillas 102 and out of the top of the container 100. In the embodiment shown, the dragger 106 is constrained to move the top tortilla 103 substantially laterally, the substantial lateral movement being guided by a track 107 to which the dragger is connected.

In the embodiment shown, the dragger 106 is capable of dragging the top tortilla 103 out of the top of the container and into a heating sub-system 108 of the tortilla warmer 101. In the embodiment shown, the dragger 106 is driven by a rotating element 109, which can in turn be driven by another element such as a gear, for example. The rotating element 109 can cause oscillatory lateral movement of the dragger 106. In the embodiment shown, the rotating element 109 rotates about a center point 110, and a free hinge joint 111 connecting rotating element 109 and the dragger 106 traces a circular path as the rotating element 109 rotates.

In other embodiments, the dragger 106 can be moved in a different fashion, while still dragging the top tortilla 103 into the heating sub-system 108. The dragger 106 can engage the top tortilla 103 via static friction, by depressing the top side of the top tortilla 103, and/or by piercing the top side of the top tortilla 103, for example.

Elements of the tortilla warmer conveying system disclosed herein can be controlled by electro-mechanical elements in some embodiments. Some such electro-mechanical elements can reside in a chamber 112 such as an electronics module and/or a gearbox. In some of these embodiments, a user-operable control panel 113, in communication with elements resident within the chamber 112 for example, can reside on the housing 101 of the tortilla warmer, to facilitate controlling aspects of the conveying system, among potentially other aspects of the tortilla warmer 101.

Figure 2:
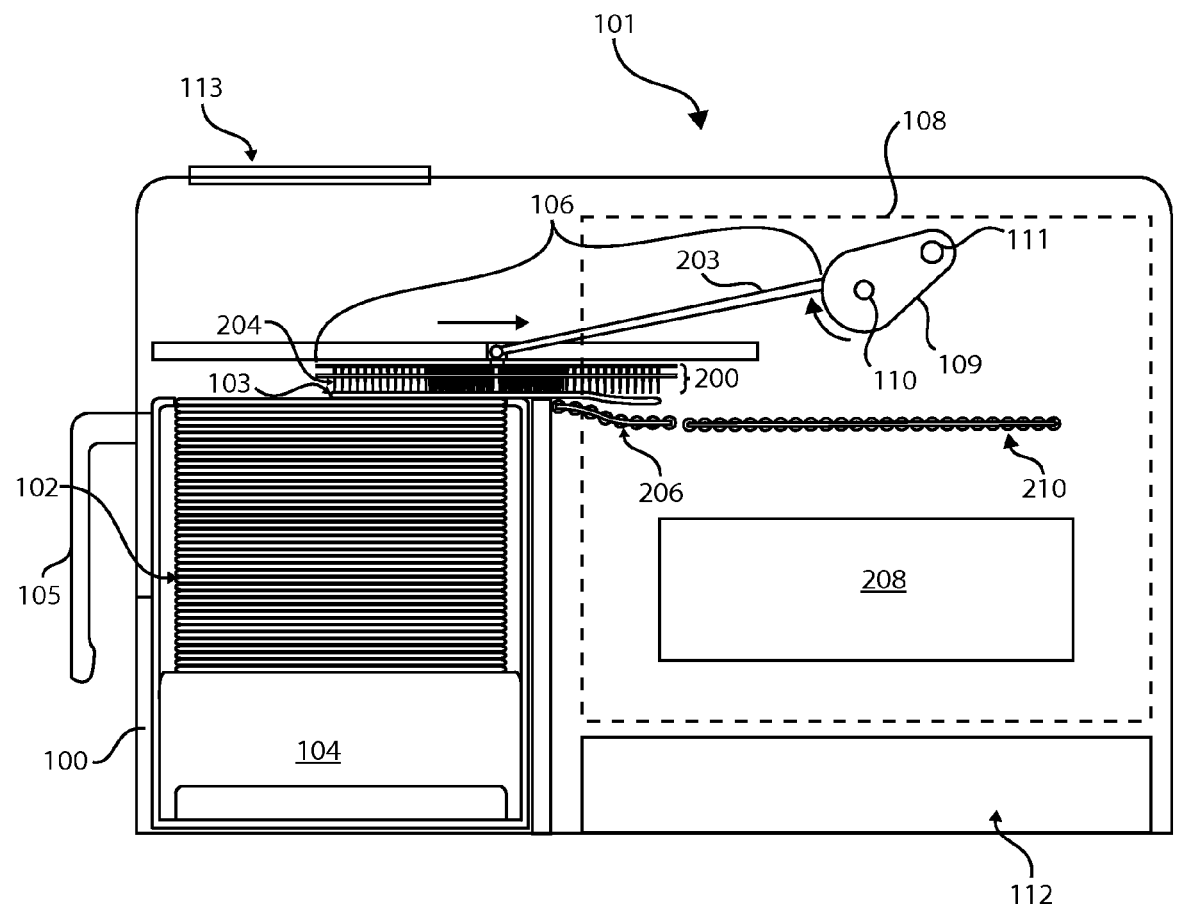
FIG. 2 is a profile view of the embodiment shown in FIG. 1, with the dragger dragging the top tortilla into a heating sub-system of the tortilla warmer.

FIG. 2 is a profile view of the embodiment shown in FIG. 1, with the dragger dragging the top tortilla into a heating sub-system of the tortilla warmer. The dragger 106 is capable of at least frictionally engaging the top side of the top tortilla 103 of the stack of tortillas 102 and dragging the top tortilla away from the stack of tortillas 102 and into the heating sub-system 108. The dragger 106 can repeat this action, thereby conveying a plurality of tortillas into the heating system, one at a time in sequence.

In the embodiment shown, the dragger 106 includes a dragger head 200 and a dragger arm 203. The dragger head 200 makes direct contact with the top side of the top tortilla 103, so as to facilitate the at least frictional engagement with the top side of the top tortilla 103. The dragger arm 203 acts as a dragger head mover, moving the dragger head 200 substantially laterally, so as to facilitate the dragging of the top tortilla 103.

The dragger head 200 is moved by the dragger arm 203, which in turn is driven by a rotating element 109. The rotating element 109 is rotated about a center point 110, and is pivotably connected to the dragger 106 via a connection 111. The dragger head 103 is driven in a substantially horizontal motion, guided by a horizontal guide track 204. The dragger head 200 is moved rightwards, and then leftwards, as the rotating element 109 rotates one full revolution.

In the embodiment shown, the dragger head 200 includes a plurality of nails 204 which at least frictionally engage the tortilla and drag it into the heating sub-system 108. The dragger head 200 can engage the top tortilla 103 through at least frictional engagement between the dragger head 200 and the top tortilla 103. For example, in some embodiments the dragger head 200 includes a set of nails 204.

In reference to the embodiment shown, the set of nails 204 can at least frictionally engage the top side of the top tortilla 103 in a variety of ways. For example, the set of nails 204 can press into the top side of the top tortilla, thereby creating static friction between the set of nails 204 and the top side of the top tortilla 103. In other embodiments, the set of nails 204 can press into the top side of the top tortilla 103 so as to depress the top side of the top tortilla 103, and thereby pull the top tortilla laterally 103 as the dragger head 204 moves laterally. In other embodiments, the set of nails 204 can pierce the top side of the top tortilla 103, thereby further facilitating pulling of the top tortilla 103.

In the embodiment shown, the dragger 106 is dragging the top tortilla 103 towards a heating platform 210. In the embodiment shown, the top tortilla 103 is first dragged across a curved roller portion 206 before being deposited onto a heating platform 210.

The heating system 108 can be any heating system known or appreciated by one of average skill in the art of heating tortillas and food-heating in general, and can employ heating via conduction, convection, and/or radiation, for example. For example, the heating system 108 can employ microwave heating, infrared heating, convection heating, conduction heating, and/or others, as well as a combination thereof. A heating element 208 is shown to represent a potential source of heat, such as a conductive toaster oven heating component providing heat to the volume enclosed by the boundaries of the heating system. Possible heating elements producing radiant heat can include a resistive a heating element, a microwave magnetron, and/or a carbon infrared emitter.

Figure 3:
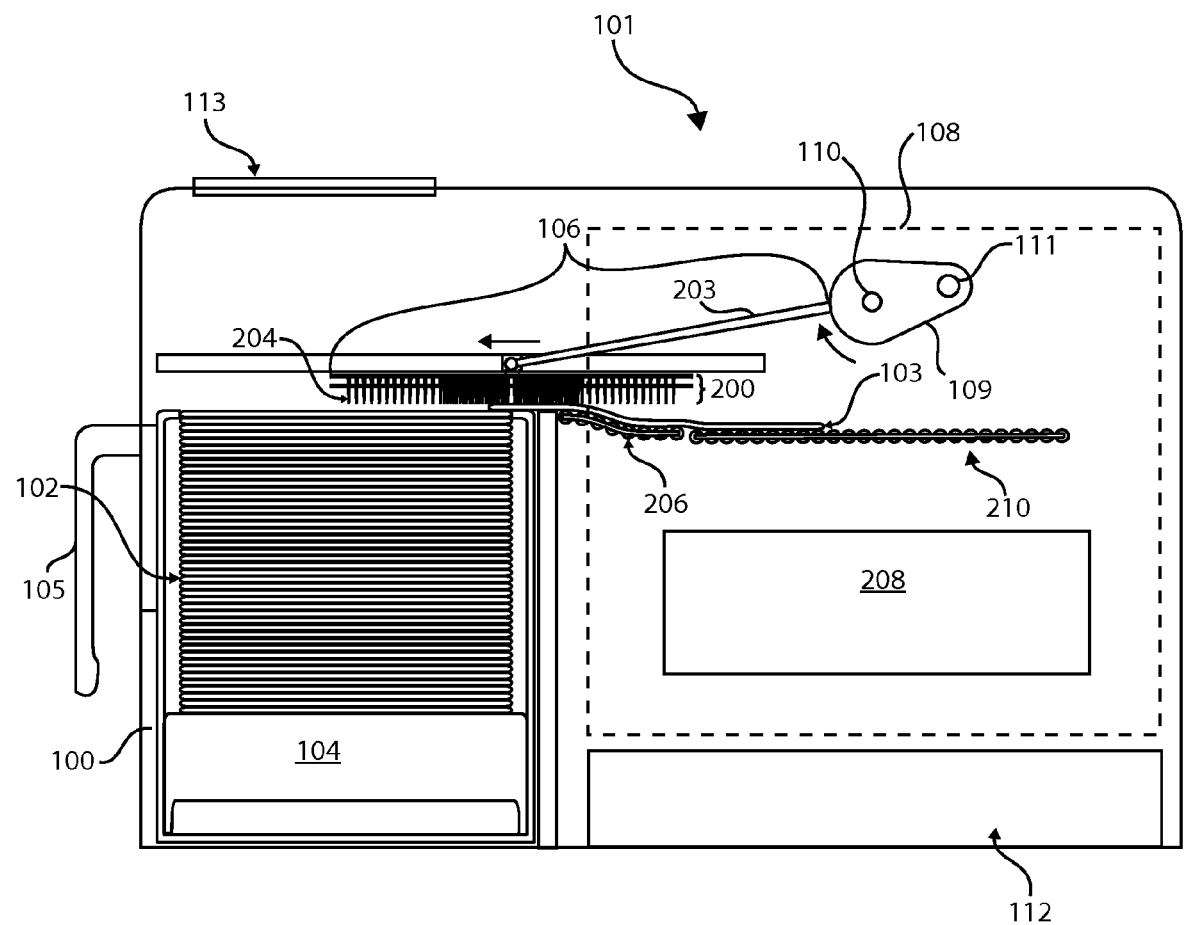
FIG. 3 is a profile view of the embodiment shown in FIG. 1, with the dragger depositing the top tortilla onto a heating platform.

FIG. 3 is a profile view of the embodiment shown in FIG. 1, with the dragger 106 in the process of depositing the top tortilla 103 onto a heating platform 210. The heating platform 210 can support the top tortilla 103 while the top tortilla 103 is heated within the heating sub-system 108. A heating element 208 can contribute heat within the heating sub-system, so as to heat the top tortilla 103. The heating element 208 can produce via conduction, convection, and/or radiation. Radiation can be produced by such heating elements 208 as a resistive heating element, a microwave magnetron, and/or a carbon infrared emitter, for example.

Figure 4:
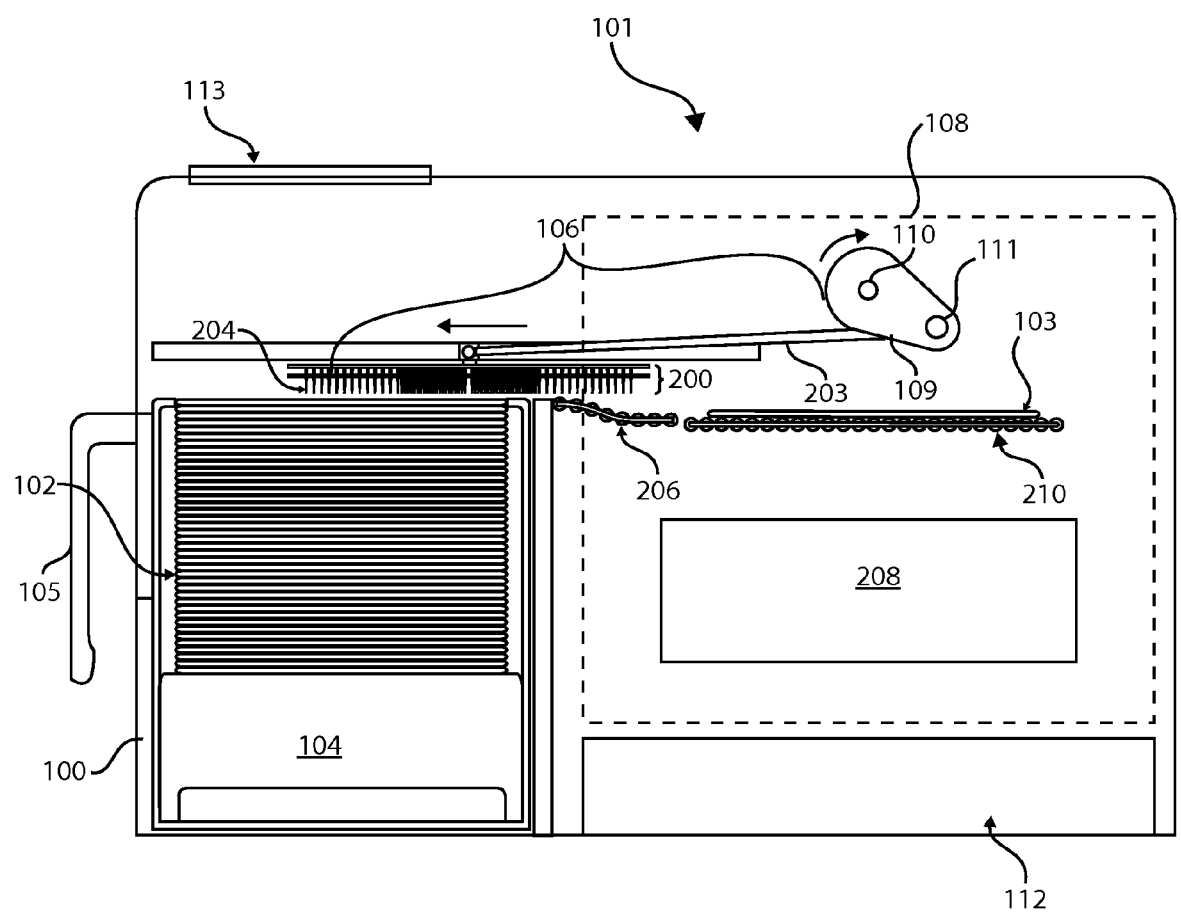
FIG. 4 is a profile view of the embodiment shown in FIG. 1, with the top tortilla fully positioned on the heating platform.

FIG. 4 is a profile view of the embodiment shown in FIG. 1, with the top tortilla 103 fully positioned on the heating platform 200. The heating platform 200 can be configured to remain stationary during heating, or alternatively the heating platform 200 can be a roller that conveys the tortilla horizontally during the heating cycle (see FIGS. 5-8).

After the top tortilla 103 has been sufficiently heated, the top tortilla 103 can be delivered outside of the heating sub-system by an extractor. In some of these embodiments, the extractor can deliver the top tortilla 103 outside of the tortilla warmer. In some embodiments, the heating platform 208 can facilitate such extracting of the top tortilla 103, for example by dispensing the top tortilla 103 through a slot in the housing. In embodiments including a roller acting as a heating platform 208, the roller can convey the top tortilla 103 through a slot. The roller can be powered to move in a manner that can accomplish such extracting of the top tortilla 103, such as the roller rotating so as to enable the top tortilla 103 to roll downward off the roller and down a slide and through a slot, for example. In other embodiments, individual rolling sub-elements of a roller can be powered to roll simultaneously, so as to roll the top tortilla 103 through a slot.

Figure 5:
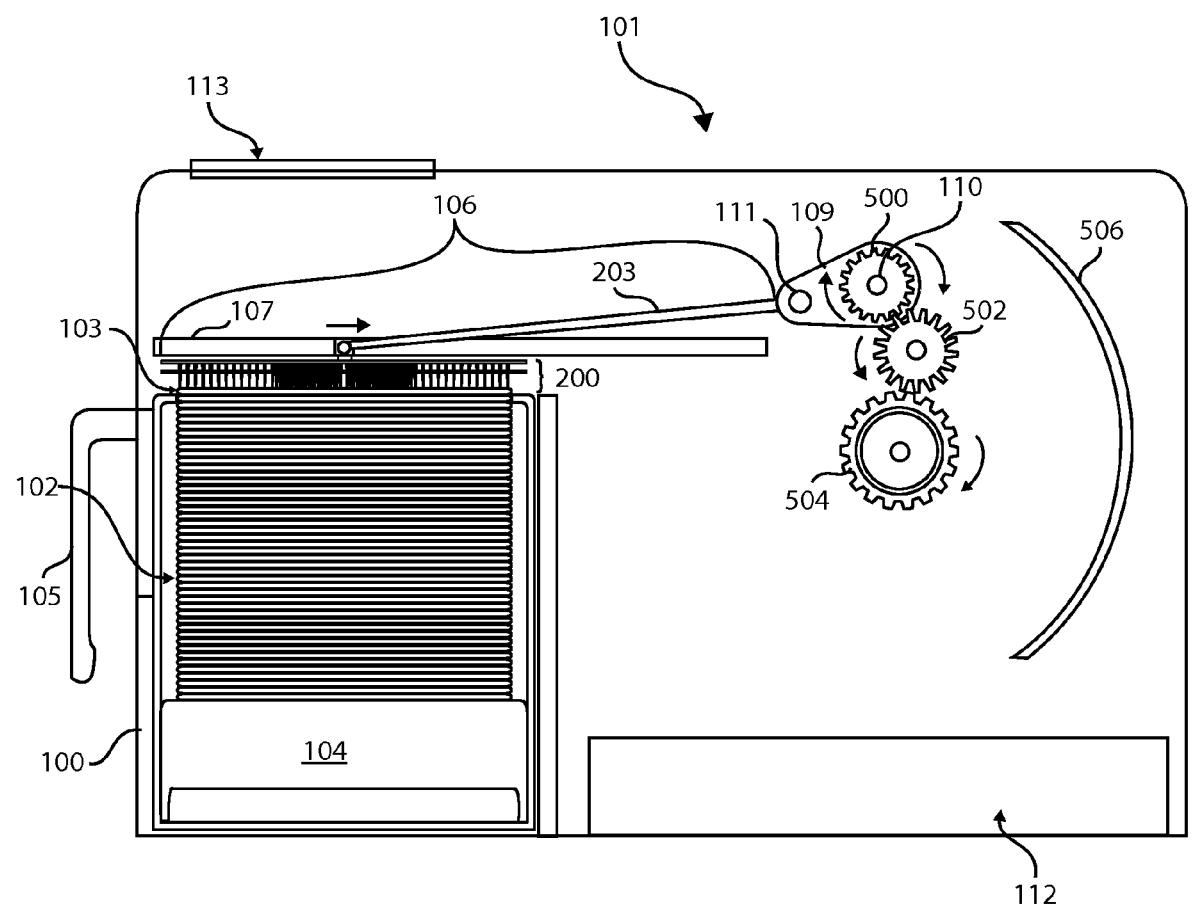
FIG. 5 is a profile view of the main elements of an alternative embodiment of the heating system, with a dragger in a position to drag a top tortilla from a cartridge.

FIG. 5 is a profile view of the main elements of an alternative embodiment of the heating system, with a dragger in a position to drag a top tortilla from a cartridge. A container 100 is shown holding multiple tortillas in a vertically stacked configuration 102. A top tortilla 103 is exposed at the top of the stack of tortillas 102. Also shown is a dragger 106 capable of at least frictionally engaging the top side of the top tortilla 103, and dragging the top tortilla 103 out of the top of the container 100 and into a heating sub-system of the tortilla warmer.

A set of gears 500, 502, 504 are shown in this figure, the gears being capable of synchronizing the movement of two heated rollers (not shown in this figure). Synchronized movement can be executed via a gear box, for example. A slider 506 is adapted to guide the top tortilla 103 as it slides off of a top heating platform, so as to enable the top tortilla 103 to land upside down on a bottom heating platform.

Figure 6:
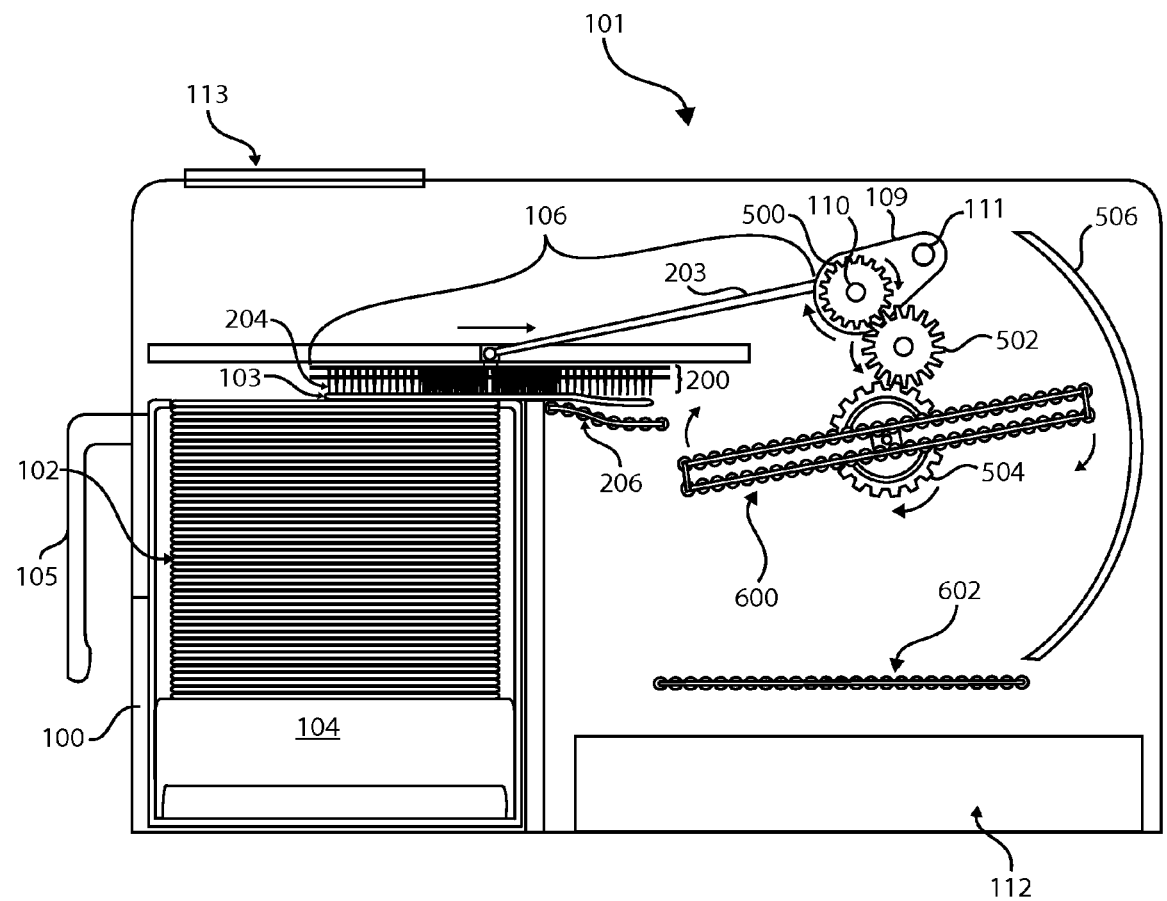
FIG. 6 is a profile view of the embodiment shown in FIG. 5, with the dragger dragging the top tortilla towards a top heating element of the tortilla warmer.

FIG. 6 is a profile view of the embodiment shown in FIG. 5, with the dragger dragging the top tortilla towards a top heating element of the tortilla warmer. In this figure, a top heating element 600 and bottom heating platform 602 are shown. In the embodiment shown, both heating platforms 600, 602 are heated rollers, acting as conductive heating elements capable of heating the top tortilla 103 via conduction.

As shown in the figure, the dragger 106 drags the top tortilla 103 off of the stack of tortillas 102 and onto an introductory roller 206, which facilitates the dragger 106 depositing the top tortilla 103 onto the top heating platform 600. As the rotating element 109 rotates, it causes the dragger 106 and the top heating platform 600 to move in synchronized fashion, so that the top heating platform 600 is positioned out to receive the top tortilla 103 when the top tortilla 103 has been strategically placed so as to be received by the top heating platform 600. Synchronized movement of the rotating element, the dragger, and/or the top heating platform can be executed via a gear box, for example.

Figure 7:
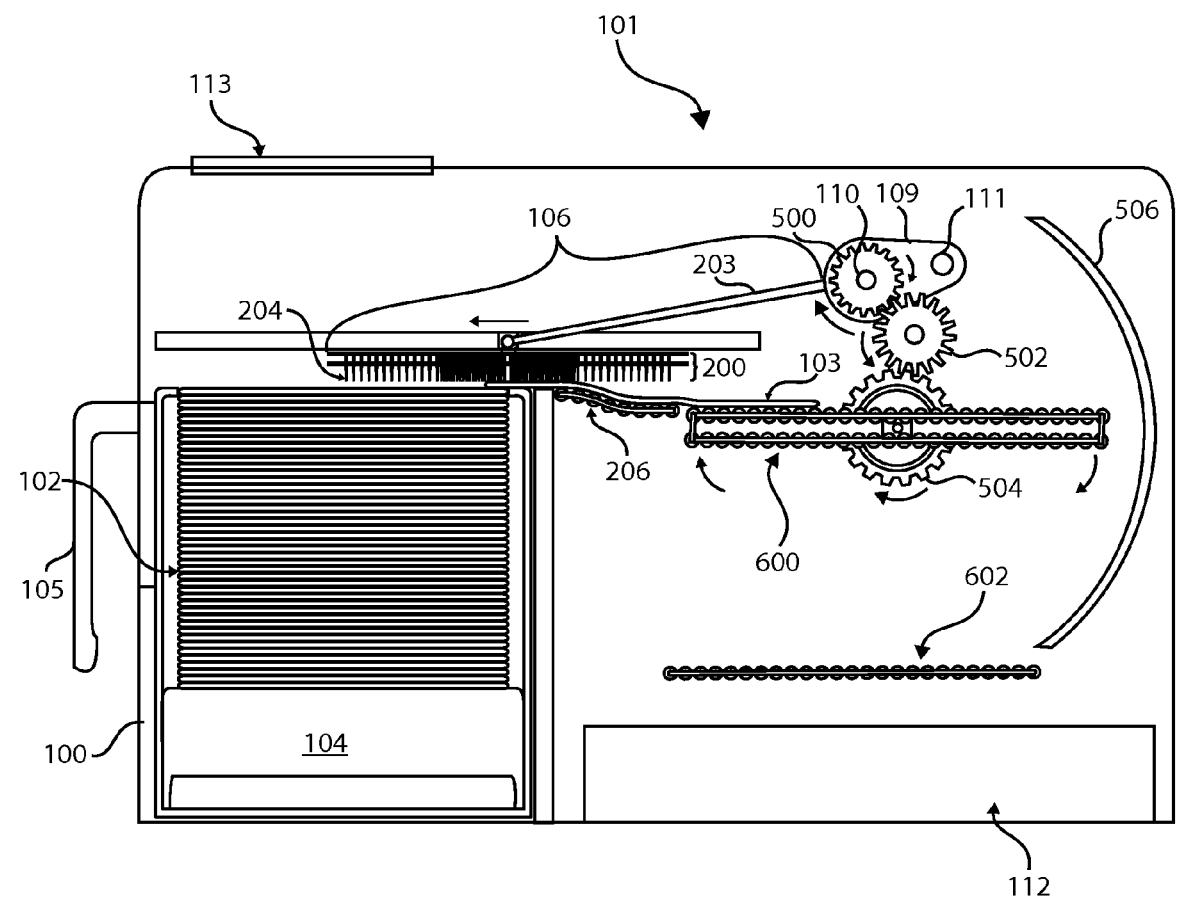
FIG. 7 is a profile view of the embodiment shown in FIG. 5, with the dragger depositing the top tortilla onto the top heating element of the tortilla warmer.

FIG. 7 is a profile view of the embodiment shown in FIG. 5, with the dragger 106 depositing the top tortilla 103 onto the top heating element 600, which is a conductive heating platform. In the embodiment shown, the top heating element 600 is a roller which can heat the bottom side of the top tortilla 103 via conduction. The top heating element 600 can also rotate, so as to deposit the top tortilla 103 upside-down onto a bottom heating element 602, which is also a heating platform. The slider 506 facilitates the top tortilla 103 being deposited face-down onto the bottom heating element 602.

The top heating element 600 is able to heat the bottom side of the top tortilla 103 once the top tortilla 103 is dragged onto the heating element 600. In the embodiment shown, the top heating element 600 is capable of rotating vertically, so as to deposit the top tortilla 103 when the top heating element 600 has sufficiently rotated. A bottom heating element 602 is also shown underneath the top heating element 600. A slider 506, which is adapted to guide the top tortilla 103 sliding off of the top heating element 600 and to cause the top tortilla to land upside down onto the bottom heating element 602, is also shown. A synchronized control system can synchronize the movement of the dragger 106, the top heating element 600, and the bottom heating element 602. Synchronized movement of the rotating element, the dragger, the top heating platform and/or the bottom heating element can be executed via a gear box, for example The heating elements 600, 602 can be electrically powered and can warm the designated side of the top tortilla 103 via conduction, for example.

Figure 8:
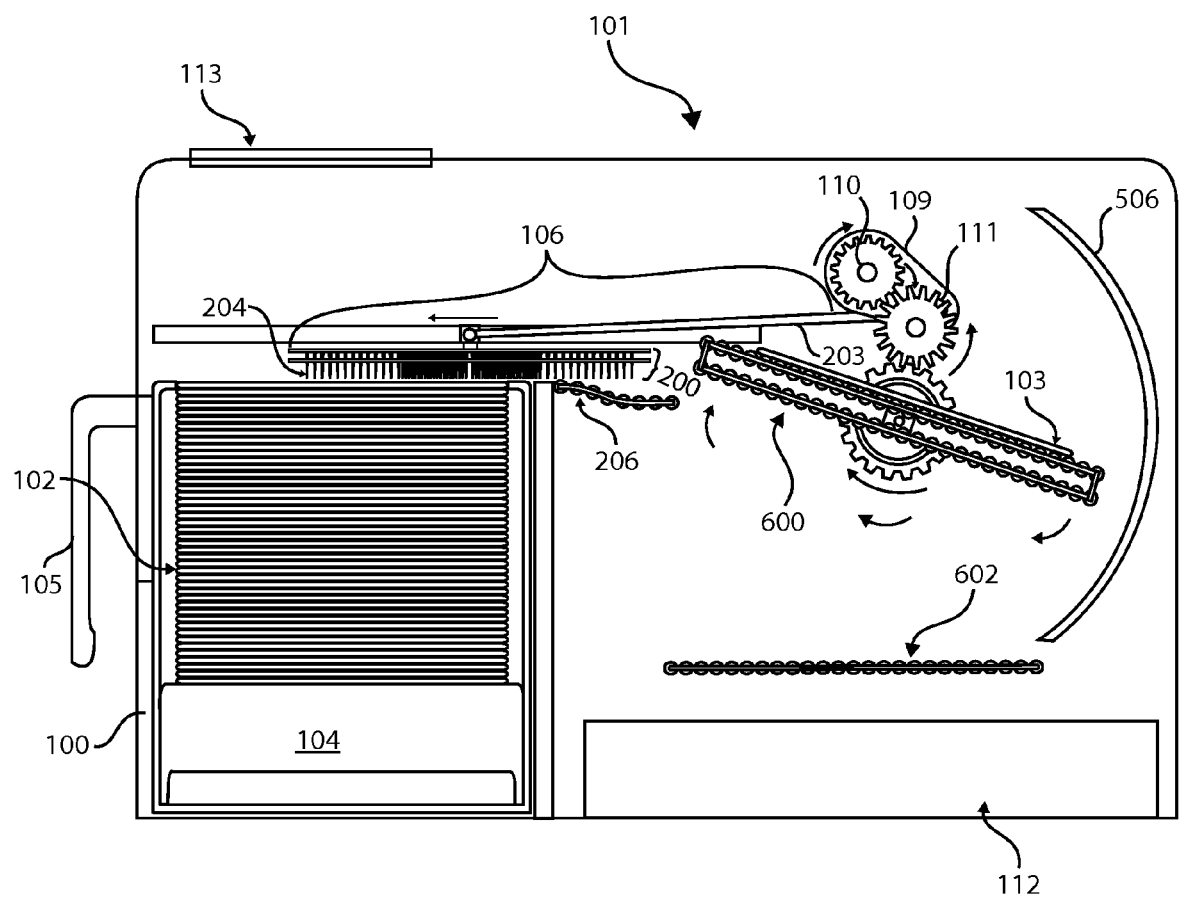
FIG. 8 is a profile view of the embodiment shown in FIG. 5, with the top tortilla being rotated so as to be deposited onto a bottom heating element of the tortilla warmer.

FIG. 8 is a profile view of the embodiment shown in FIG. 5, with the top tortilla being rotated so as to be deposited onto a bottom heating element of the tortilla warmer.

A slider oriented vertically in the shape of an arc 506 can stabilize the tortilla 103 while it is being rotated, and being deposited onto the bottom heating element 602. The bottom heating element 602 is also an electrically heated roller, in the embodiment shown. The bottom heating element can also serve as an extractor for delivering the tortilla 103 outside of the tortilla warmer, upon completion of heating the tortilla.

All of the moving components of the conveying system and/or the heating system, or a sub-combination thereof, can be electrically powered. Furthermore, components of the conveying system can be synchronized so as to automatically be timed to interact with each other at the appropriate speed and timing. For example, a gear controlling a cycle of movement of the dragger 500 can be in communication with a gear controlling a cycle of rotation of the roller 504 (via middle gear 502), as shown.

Figure 9A:
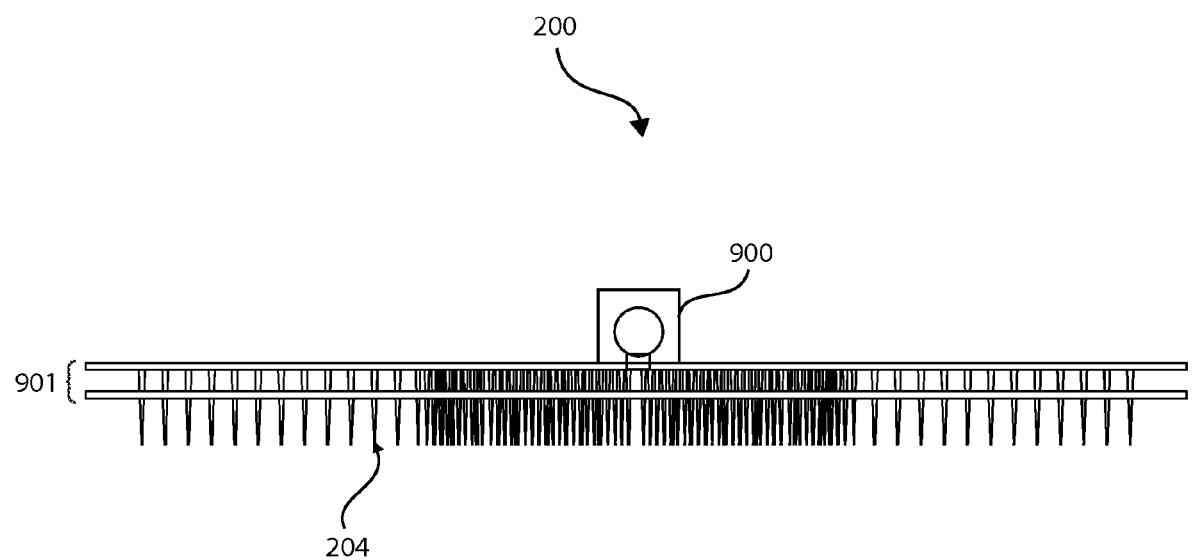
FIG. 9A is an isolated profile view of a nail dragger head.

FIG. 9A is an isolated profile view of a dragger head 200. In the embodiment shown, the dragger head 200 includes nails 204 that are capable of can at least frictionally engaging a surface of a tortilla. A connector bracket 900 is also shown at the top of the dragger head 200, which is able to connect the dragger head 200 to the dragger arm (shown in earlier drawings). The connector bracket 900 can also serve as a connection point between the dragger head 200 and the track (shown in earlier drawings), so as to facilitate substantially lateral movement of the dragger head 200. The dragger head 200 includes a structural support 901 that promotes stability of the nails 204. The nails 204 can engage a tortilla via static friction, via depression of the tortilla, or even piercing of a surface of the tortilla. In preferred embodiments, the nails 204 can be configured to wholly or partially retract during a certain portion of the cycle of movement, so as to facilitate disengagement from a tortilla when the tortilla is dragged to a heating platform and needs to separate from the dragger head. Such retraction can be accomplished via a spring system, for example.

Figure 9B:
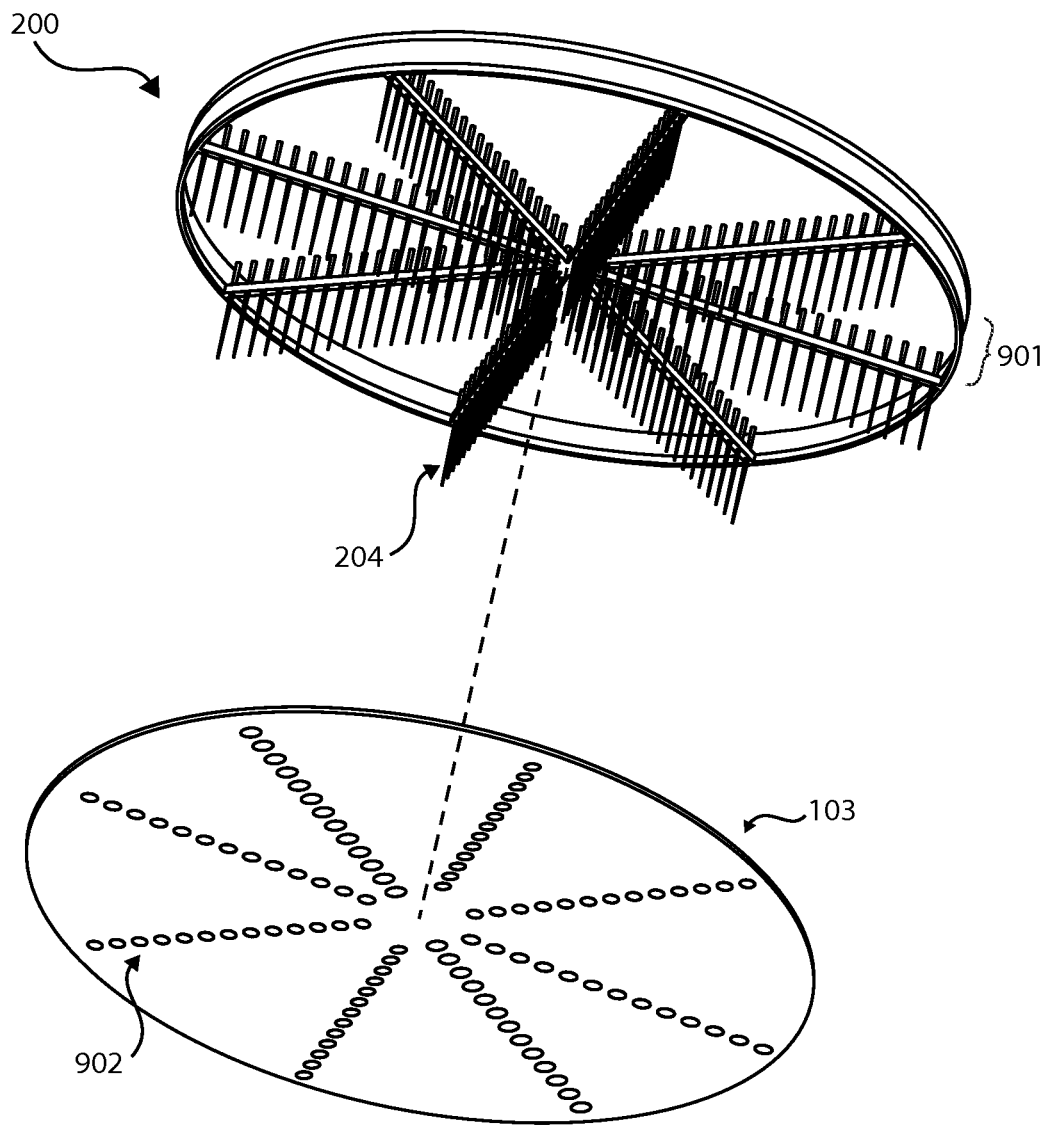
FIG. 9B is an isolated oblique underside view of the nail dragger head of FIG. 5A.

FIG. 9B is an isolated oblique underside view of the nail dragger of FIG. 5A, shown in relation to a tortilla with which it can at least frictionally engage. As shown in this figure, the nails 204 can be arranged in a pattern of several lines intersecting with each other at their respective middle points. The nails 204 can be configured so as to penetrate a tortilla, thereby impressing this same pattern of lines in the tortilla itself. This pattern can facilitate breaking a sufficiently heated and hardened tortilla into wedges, which is sometimes desirable when eating tostadas, for example. In the embodiment shown, this dragger head 200 includes a solid lip 901.

Figure 10A:
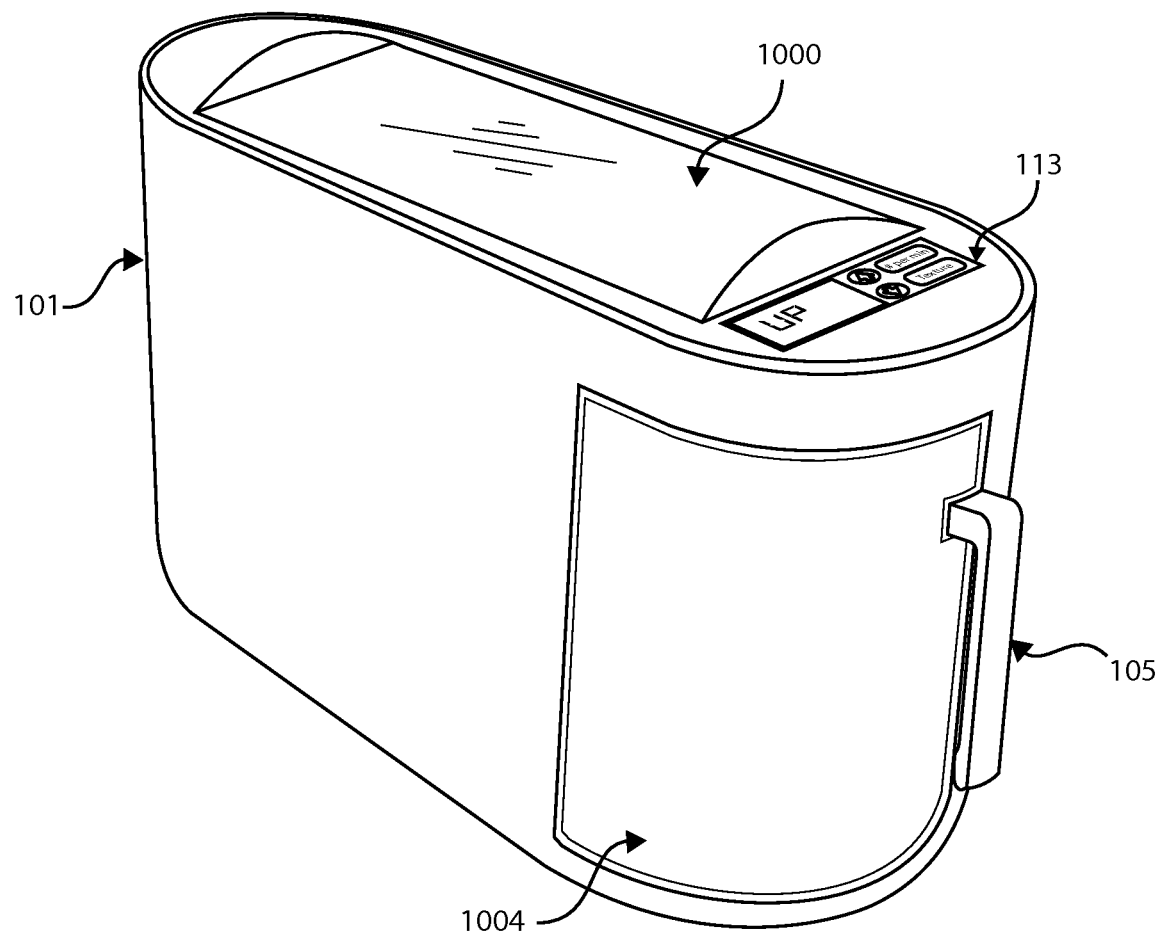
FIG. 10A is an oblique view of a housing of the tortilla warmer, including a sliding access door for accessing a tortilla cartridge.
Figure 10B:
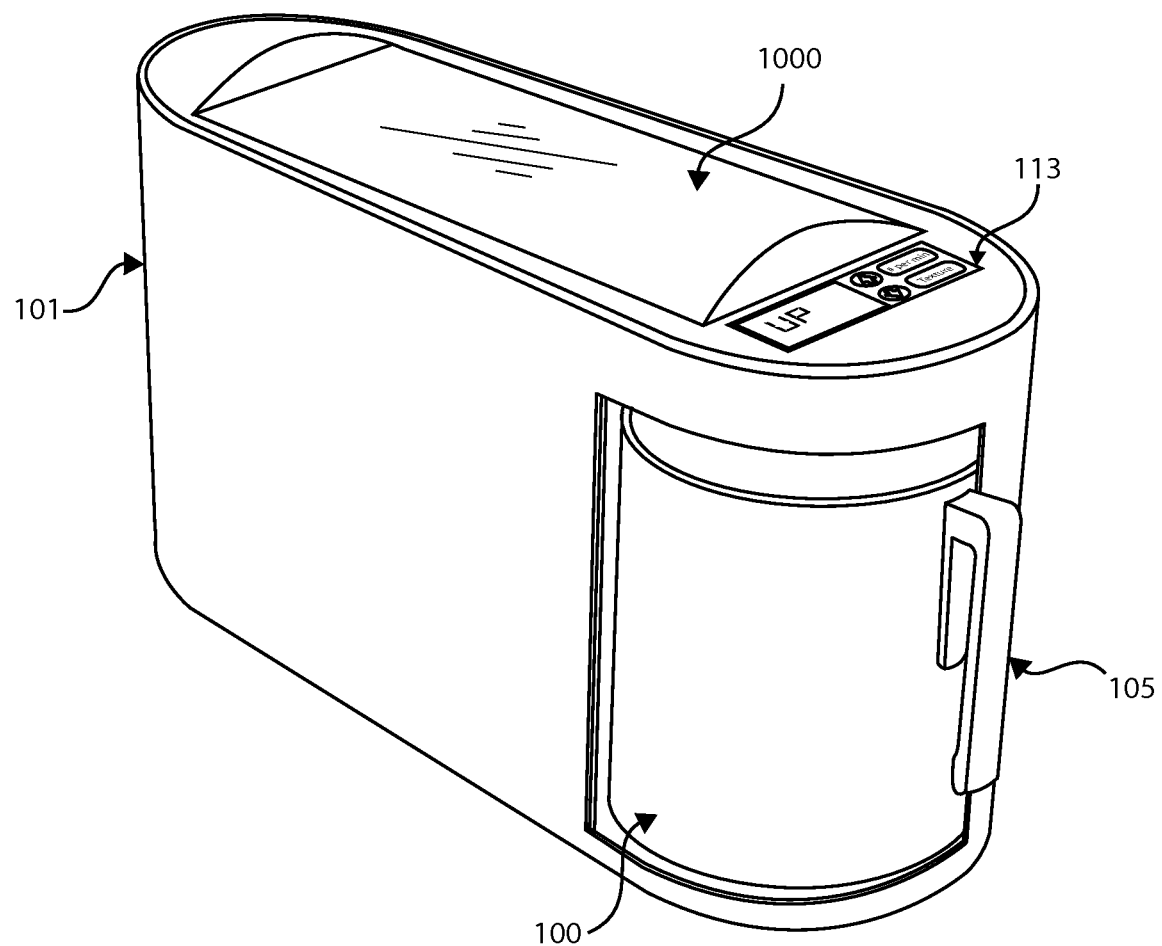
FIG. 10B is the oblique view of FIG. 6A, shown with the access door slid open to reveal the tortilla cartridge.
Figure 10C:
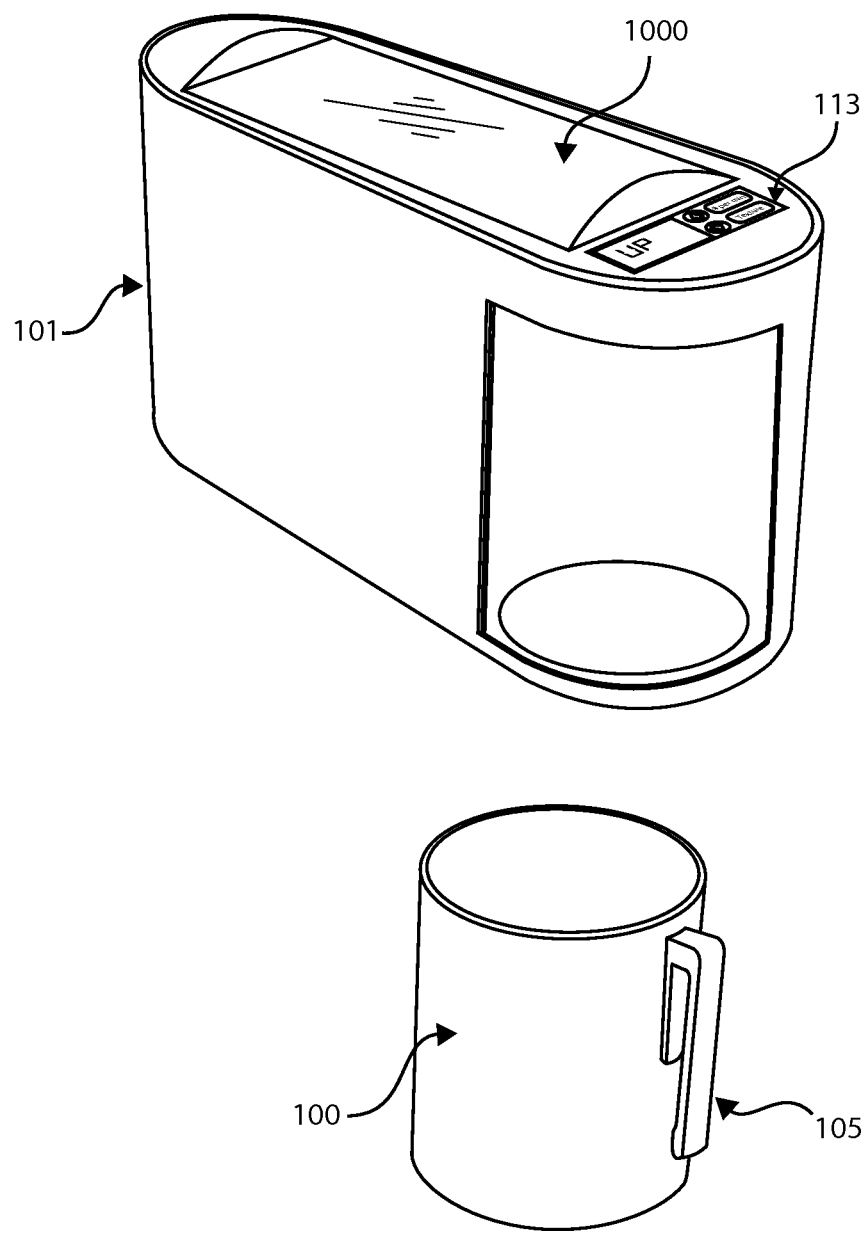
FIG. 10C is the oblique view of FIG. 6B, shown with the tortilla cartridge removed from the housing.

FIG. 10A is an oblique view of a housing 101 of the tortilla warmer, including a sliding access door 1004 for accessing a tortilla cartridge (the handle 105 of the cartridge is visible protruding from an inlet of the access door 1004), and FIG. 10B is the oblique view of FIG. 6A, shown with the access door (not shown here) slid open to reveal the tortilla cartridge 100. FIG. 10C is the oblique view of FIG. 6B, shown with the tortilla cartridge 100 having been removed from the housing 101. The tortilla cartridge 100 can be stored in a separate place, such as a refrigerator, when not being used to provide tortillas for a heating session of the tortilla warmer.

Figure 11:
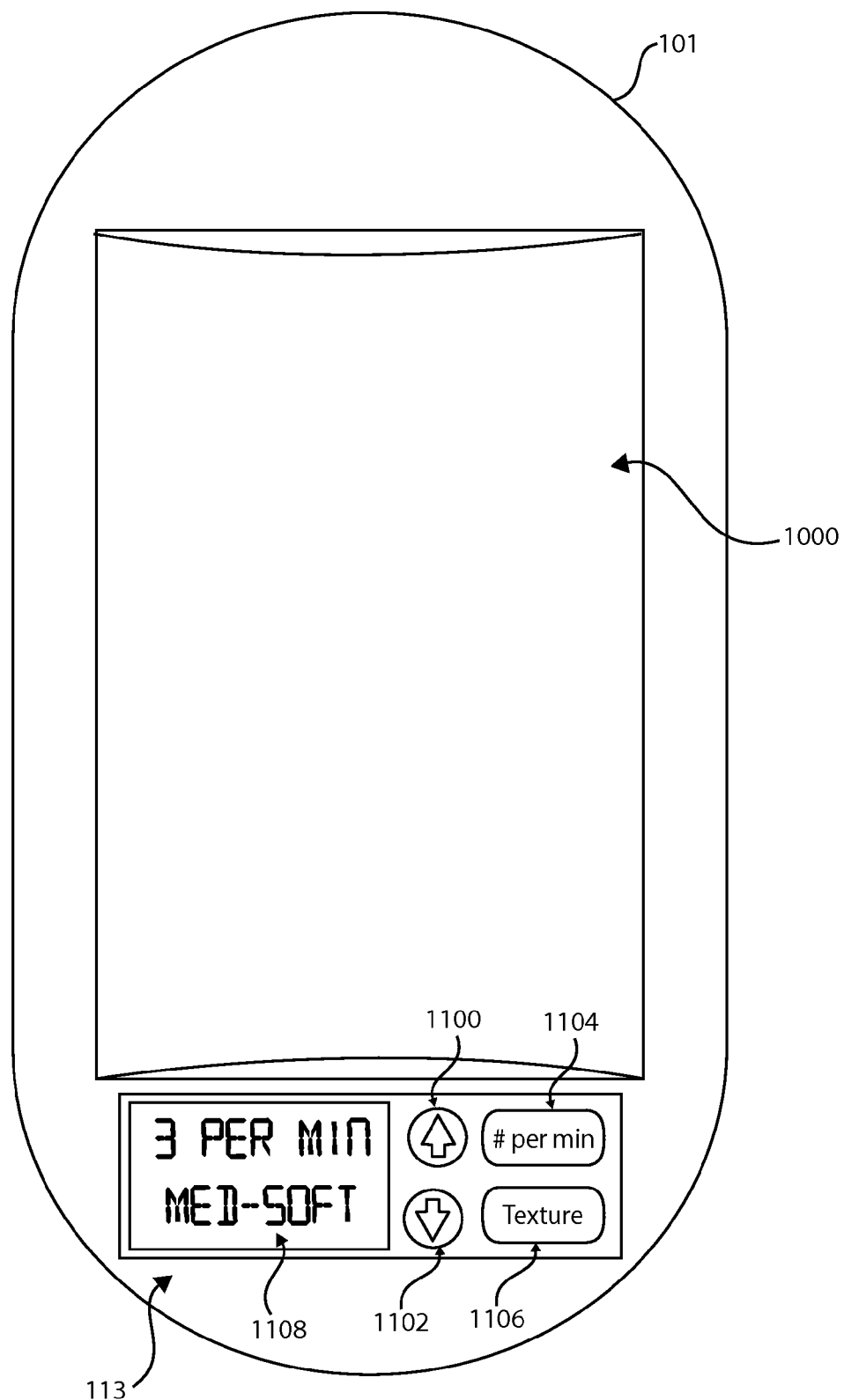
FIG. 11 is an exemplary control panel that can be located on the housing of the heating system.

FIG. 11 is an exemplary control panel 113 that can be located on the housing 101 of the tortilla warmer. Up and down arrow buttons 1100, 1102 can enable a user to adjust the desired texture of a heated tortilla. Changing the desired texture can change the temperature of the heating sub-system, for example. The up 1100 and down 1102 arrows can also enable a user to adjust the desired speed at which the tortillas are conveyed through the heating sub-system in sequence. A display screen 113 can display what setting is being input for a given option.

Figure 12:
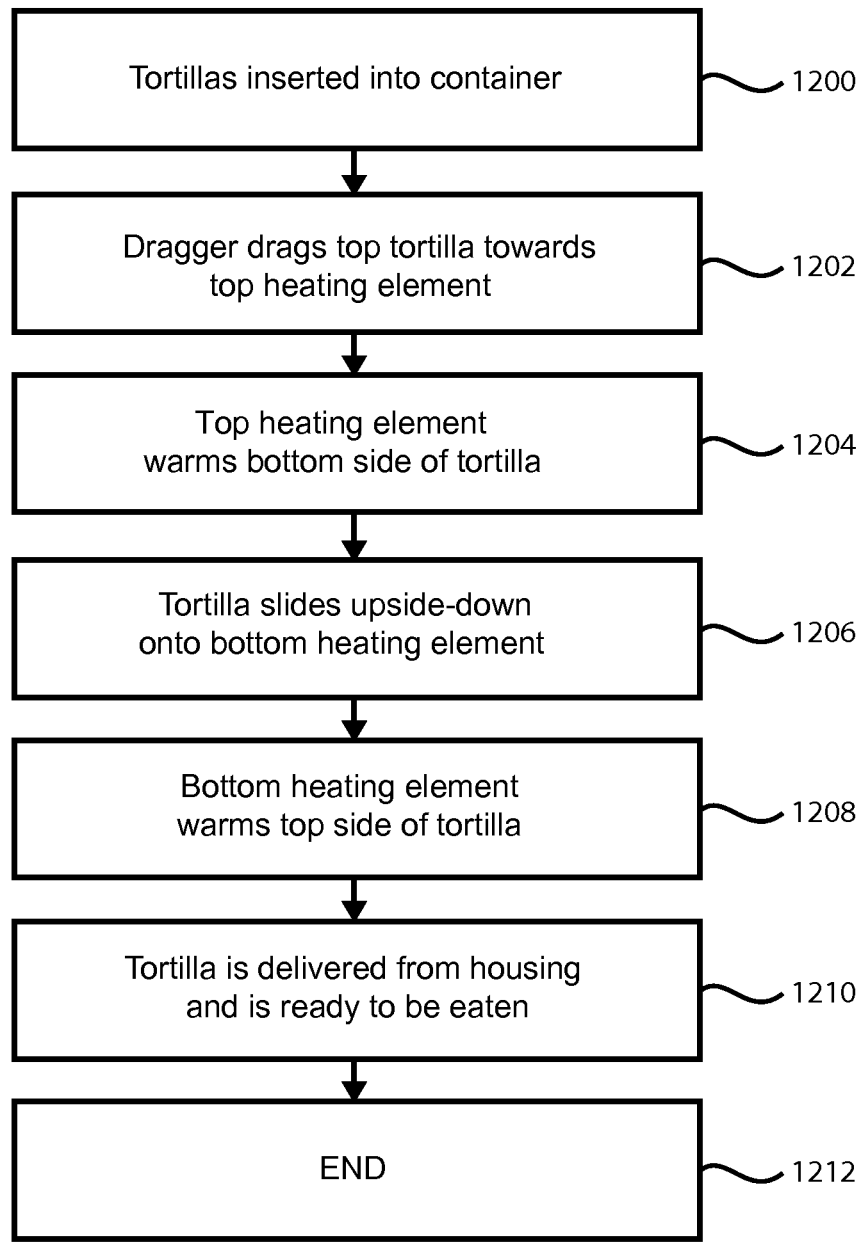
FIG. 12 is a flow chart showing the steps of heating in an exemplary embodiment of the heating system.

FIG. 12 is a flow chart showing the steps of heating in an exemplary embodiment of the heating system, this particular embodiment including a top heating element and a bottom heating element. First, a stack of tortillas are inserted into the tortilla cartridge container 1200. Next, the dragger drags the top tortilla towards the top heating element, as the top heating element rotates close to the level horizontal position so as to receive the top tortilla 1202.

Once the top tortilla has been deposited onto the top heating element, its bottom side is warmed by the top heating roller 1204. As the top heating element continues rotating, it eventually reaches an angle which enables the top tortilla to be deposited upside-down onto the bottom heating element 1206. The bottom heating element then heats the top side of the top tortilla 1208.

Finally the tortilla is expelled from the tortilla warmer housing via an exit slot and is ready to be eaten 1210. In some embodiments, a cover used for the tortilla cartridge when tortillas are not being warmed, can be placed under the exit slot when tortillas are being heated, so as to receive the heated tortillas.

A tortilla warmer equipped with the conveying system disclosed herein, can further include an electrical power cord, a smoke detector, a fire alarm, and/or an emergency off switch.

Other modifications and implementations will occur to those skilled in the art without departing from the spirit and the scope of the invention as claimed. Accordingly, the above description is not intended to limit the invention except as indicated in the following claims.

What is claimed is:

1. A tortilla conveying system of a tortilla warmer, the tortilla conveying system being for sequentially conveying a plurality of tortillas to a heating subsystem of the tortilla warmer to be warmed, the tortilla conveying system comprising:
   a container capable of holding a plurality of tortillas in a stacked configuration, with a top side of a top tortilla of the stacked plurality of tortillas being exposed at an open top of the container; and
   a dragger that includes a dragger head that makes direct contact with the top surface of the top tortilla to facilitate the frictional engagement between the dragger and the top tortilla, the dragger configured to:
   frictionally engage with the top side of the top tortilla,
   drag the top tortilla off of the top of the stacked plurality of tortillas, and
   deliver the top tortilla to the heating subsystem of the tortilla warmer, and
   wherein the dragger head is constrained to move horizontally within a single substantially lateral track at a level that ensures it will always engage with the exposed top surface of the top tortilla of the stacked plurality of tortillas.

2. The tortilla conveying system of claim 1, wherein the dragger head includes a set of nails located on an underside of the dragger head.

3. The tortilla conveying system of claim 1, wherein the set of nails are arranged along a set of lines passing through a center of the underside of the dragger head.

4. The tortilla conveying system of claim 1, wherein the set of nails are configured to create perforations in the top tortilla.

5. The tortilla conveying system of claim 1, wherein the dragger includes a dragger head mover, the dragger head mover moving the dragger head substantially laterally, so as to facilitate the dragging of the top tortilla.

6. The tortilla conveying system of claim 1, wherein the dragger is driven by a rotating element that is pivotably connected to the dragger.

7. The tortilla conveying system of claim 6, wherein the rotating element is directly driven by a motor.

8. A tortilla conveying system of a tortilla warmer, the tortilla conveying system being for sequentially conveying a plurality of tortillas to a heating subsystem of the tortilla warmer to be warmed, the tortilla conveying system comprising:
- a container capable of holding a plurality of tortillas in a stacked configuration, with a top side of a top tortilla of the stacked plurality of tortillas being exposed at an open of the container; and
- a dragger configured to:
  - frictionally engage with the top side of the top tortilla,
  - drag the top tortilla off of the top of the stacked plurality of tortillas, and
  - deliver the top tortilla to the heating subsystem of the tortilla warmer, and
- wherein the container includes an elevator assembly for ensuring a top side of a top tortilla is constantly exposed at the top opening of the container.

9. The tortilla conveying system of claim 8, further comprising a synchronizing control system for synchronizing movement between the elevator assembly and the dragger.

10. The tortilla conveying system of claim 8, wherein the heating subsystem further comprises at least one heating element.

11. The tortilla conveying system of claim 10, wherein the heating element is a conductive heating platform.

12. The tortilla conveying system of claim 8, wherein the tortilla warmer includes an extractor capable of delivering the top tortilla outside of the heating subsystem.

13. The tortilla conveying system of claim 8, further comprising a lid for covering the top of the container when the top tortilla is not being warmed.

14. The tortilla conveying system of claim 8, wherein heating of the top tortilla is performed by convection.

15. The tortilla conveying system of claim 14, wherein heating of the top tortilla is performed by conduction produced by at least one heated roller.

16. The tortilla conveying system of claim 14, wherein heating of the top tortilla is performed by radiation produced by a resistive heating element.

17. The tortilla conveying system of claim 8, further comprising a housing in which to house the container and the dragger.

18. The tortilla conveying system of claim 17, wherein the housing further comprises a door which provides access to the container.

19. A tortilla conveying system of a tortilla warmer, the conveying system comprising:
- a container capable of holding a plurality of tortillas in a stacked configuration, with a top side of a top tortilla of the stacked plurality of tortillas being exposed at an open top of the container;
- a dragger configured to frictionally engage with the top side of the top tortilla and drag the top tortilla off of the top of the stacked plurality of tortillas;
- a heating subsystem comprising:
  - a top heating platform for receiving and supporting the top tortilla from the dragger, and including a heating element for heating the top surface of the received top tortilla, the top heating platform configured to rotate to a vertical position to cause the top tortilla to slide off of the top heating platform;
  - a bottom heating element for receiving the top tortilla as the top tortilla slides from the top heating element, the bottom heating element for supporting and heating the bottom surface of the received top tortilla, the bottom heating element including a roller mechanism for conveying the heated top tortilla to a space outside of the tortilla warmer; and
  - a slider member adapted to guide the top tortilla as the top tortilla slides off of the top heating platform so that the top tortilla lands on the bottom heating element upside down and onto the bottom surface of the top tortilla.

20. The tortilla conveying system of claim 19, wherein at least one of the top heating platform and the bottom heating platform is a conductive heating element.

21. The tortilla heating system of claim 19, further comprising a synchronizing control system for synchronizing movement between the elevator assembly, the dragger, the top heating platform and the roller of the bottom heating element.

22. The tortilla heating system of claim 19, wherein the tortilla container further includes an elevator assembly, the elevator including an elevator platform driven by a motor-driven gear, for ensuring that the top side of the top-most tortilla is always exposed at the top of the container regardless of how many tortillas remain in the container.

* * * * *